United States Patent
Miyamoto et al.

(10) Patent No.: US 10,949,908 B2
(45) Date of Patent: Mar. 16, 2021

(54) ORDER ACCEPTING DEVICE, ORDER ACCEPTING METHOD, AND ORDER ACCEPTING PROCESS

(71) Applicant: RAKUTEN, INC., Tokyo (JP)

(72) Inventors: Manabu Miyamoto, Shinagawa-ku (JP); Jun Ishii, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 445 days.

(21) Appl. No.: 14/766,171

(22) PCT Filed: Aug. 29, 2013

(86) PCT No.: PCT/JP2013/073128
§ 371 (c)(1),
(2) Date: Aug. 6, 2015

(87) PCT Pub. No.: WO2015/029180
PCT Pub. Date: Mar. 5, 2015

(65) Prior Publication Data
US 2015/0379611 A1    Dec. 31, 2015

(51) Int. Cl.
*G06Q 30/00* (2012.01)
*G06Q 30/06* (2012.01)
*G06Q 30/02* (2012.01)

(52) U.S. Cl.
CPC ......... *G06Q 30/0631* (2013.01); *G06Q 30/02* (2013.01); *G06Q 30/06* (2013.01); *G06Q 30/0633* (2013.01)

(58) Field of Classification Search
CPC ............ G06Q 30/0601–0645; G06Q 30/0631
(Continued)

(56) References Cited

U.S. PATENT DOCUMENTS 9,189,811 B1* 11/2015 Bhosle ............... G06Q 30/0631
2003/0167206 A1* 9/2003 Shirai ..................... G06Q 20/20
705/16
(Continued)

FOREIGN PATENT DOCUMENTS

JP    2012-14404 A    1/2012

OTHER PUBLICATIONS

Wang, J. (2013). Session aware recommender system in e-commerce (Order No. 3589368). Available from ProQuest Dissertations & Theses Global. (1430475174). Retrieved from https://search.proquest.com/docview/1430475174?accountid=14753 (Year: 2013).*
(Continued)

*Primary Examiner* — Jason B Dunham
*Assistant Examiner* — Arielle E Weiner
(74) *Attorney, Agent, or Firm* — Sughrue Mion, PLLC (57) ABSTRACT

An acquirer (101) acquires, when a first product is dropped into an electronic cart, a second product similar to the first product, a first bonus provided on condition that an order for the first product is placed, and a second bonus provided on condition that an order for the second product is placed. A presenter (102) presents a form in which a first object related to the first product dropped into the electronic cart is arranged and a second object related to the acquired second product is further arranged, if the acquired second bonus is more advantageous than the acquired first bonus. An acceptor (103) accepts an order for the first product if the first object is operated. A cart manager (104) drops the second product in the electronic cart if the second object is operated.

17 Claims, 10 Drawing Sheets (58) Field of Classification Search
USPC .............................................. 705/26.1–27.2
See application file for complete search history.

(56) References Cited

U.S. PATENT DOCUMENTS

| | | | | |
|---|---|---|---|---|
| 2007/0280329 | A1* | 12/2007 | Kawauchi | G01J 5/08 374/131 |
| 2013/0103634 | A1* | 4/2013 | Jojic | G06Q 30/02 706/52 |
| 2014/0052571 | A1* | 2/2014 | Raman | G06Q 30/0633 705/26.8 |
| 2014/0164220 | A1* | 6/2014 | Desai | G06Q 20/06 705/39 |
| 2014/0297460 | A1* | 10/2014 | Kreiner | G06Q 30/06 705/26.7 |

OTHER PUBLICATIONS

International Search Report of PCT/JP2013/073128, dated Nov. 5, 2013. [PCT/ISA/210].

* cited by examiner

PRODUCT TABLE 121

| PRODUCT | SHOP | MANUFACTURER |
|---|---|---|
| FOOD 1 | SHOP A | MANUFACTURER X |
| BOOK 1 | SHOP B | MANUFACTURER X |
| GARMENT 1 | SHOP C | MANUFACTURER Y |
| FOOD 2 | SHOP A | MANUFACTURER Z |
| ⋮ | ⋮ | ⋮ |

FIG.6

BONUS TABLE 122

| BONUS | CONDITION | CONTENT |
|---|---|---|
| BONUS A | FOOD 1 | FREE DELIVERY |
| BONUS B | FOOD 2 | 100 POINTS PROVIDED |
| BONUS C | FOOD 2<br>FOOD 3 | 200 POINTS PROVIDED |
| BONUS D | GARMENT 1 | 100 POINTS PROVIDED |
| ⋮ | ⋮ | ⋮ |

| SHOP NAME: SHOP A | | | |
|---|---|---|---|
| PRODUCT NAME | UNIT PRICE (WITH TAX) | NUMBERS ORDERED | SUB TOTAL |
| FOOD 1 | 1050 YEN | 2 | 2100 YEN |
| | | TOTAL | 2100 YEN |

PLEASE INPUT YOUR NAME, ADDRESS AND PHONE NUMBER IN THE FOLLOWING FORM AND PU SH "NEXT" BUTTON.

| NAME | SURNAME ▢  GIVEN NAME ▢ |
|---|---|
| POSTAL CODE | ▢ — ▢ |
| ADDRESS | ▢ |
| PHONE NUMBER | ▢ — ▢ — ▢ |

NEXT

ORDER ACCEPTING DEVICE, ORDER ACCEPTING METHOD, AND ORDER ACCEPTING PROCESS

CROSS REFERENCE TO RELATED APPLICATIONS

This application is a National Stage of International Application No. PCT/JP2013/073128 filed Aug. 29, 2013, the contents of all of which are incorporated herein by reference in their entirety.

TECHNICAL FIELD

The present disclosure relates to an order accepting device, an order accepting method, a program and a recording medium.

BACKGROUND ART

In Internet shopping, when a user selects a product the user desires to purchase, the product is registered in a list of the products the user desires to purchase, within, what is called, a shopping basket. Unexamined Japanese Patent Application Kokai Publication No. 2012-14404 discloses a technique in which, when an accounting page is displayed, a message that a user can acquire a bonus by further purchasing a predetermined product in addition to the product registered in the shopping basket is presented.

CITATION LIST

Patent Literature

Patent Literature 1: Unexamined Japanese Patent Application Kokai Publication No. 2012-14404.

SUMMARY OF INVENTION

Technical Problem

However, in the conventional Internet shopping, even if a user purchases the product in the shopping basket and a bonus is given, there may be a product which is similar to but different from the purchased product and if the similar product instead of the purchased product is purchased, a bonus more advantageous than the given bonus may be received. Therefore, it is desirable for the user to be given an opportunity in which the user compares the product in the shopping basket with a similar product and choose a more advantageous product, before actually purchasing the product in the shopping basket.

The present disclosure is made in view of the above-mentioned actual condition. It is an objective of the present disclosure to provide an order accepting device, an order accepting method, a program and a recording medium that can present a product for which a bonus more valuable to the user is provided.

Solution to Problem

In order to achieve the above-mentioned objective, an order accepting device according to the first aspect of the present disclosure comprising:

an acquirer that acquires, when a first product is dropped into an electronic cart,
a second product similar to the first product,
a first bonus provided on condition that an order for the first product is placed, and
a second bonus provided on condition that an order for the second product is placed;
a presenter that presents a form in which a first object related to the first product dropped into the electronic cart is arranged and a second object related to the acquired second product is further arranged, if the acquired second bonus is more advantageous than the acquired first bonus;
an acceptor that accepts an order of the first product when the first object is operated; and
a cart manager that drops the second product into the electronic cart when the second object is operated.

The order accepting device according to the above-mentioned aspect is characterized in that, when the second object is operated, the cart manager removes the first product from the electronic cart.

The order accepting device according to the above-mentioned aspect is characterized in that the acquirer acquires as the second product at least one of a product sold in a shop which is identical to a shop in which the first product is sold, and a product manufactured by a manufacturer which is identical to a manufacturer in which the first product is manufactured.

The order accepting device according to the above-mentioned aspect is characterized in that the presenter presents a form in which a second object is further arranged, the second object being related to the second product, and the degree of similarity, showing how similar is the second product to the first product, being higher than a predetermined standard for comparison.

The order accepting device according to the above-mentioned aspect is characterized in that the presenter determines that, the greater the compensation to a user that is included in the second bonus compared with the compensation to the user that is included in the first bonus, the more advantageous is the second bonus than the first bonus; and/or the smaller the compensation to be paid by the user on condition that the second bonus is provided compared with the compensation to be paid by the user on condition that the first bonus is provided, the more advantageous is the second bonus than the first bonus.

The order accepting device according to the above-mentioned aspect is characterized in that the cart manager drops into the electronic cart the second product in the amount closest to the amount of the first product among the amount of the first product and an amount more than the amount of the first product.

An order accepting method according to a second aspect of the present disclosure is characterized in that the order accepting method is performed by an order accepting device comprising an acquirer, a presenter, an acceptor and a cart manager, the method comprising:

an acquiring step in which the acquirer acquires, when a first product is dropped into an electronic cart,
a second product similar to the first product,
a first bonus provided on condition that an order for the first product is plac ed, and
a second bonus provided on condition that an order for the second product is placed;
a presenting step in which the presenter presents a form in which a first object related to the first product dropped into the electronic cart is arranged and a second object related to the acquired second product is further arranged, if the acquired second bonus is more advantageous than the acquired first bonus;

an accepting step in which the acceptor accepts an order of the first product when the first object is operated; and a cart managing step in which the cart manager drops the second product into the electronic cart when the second object is operated.

A program according to the third aspect of the present disclosure causes a computer to function as:

an acquirer that acquires, when a first product is dropped into an electronic cart, a second product similar to the first product, a first bonus provided on condition that an order for the first product is placed, and a second bonus provided on condition that an order for the second product is placed;

a presenter that presents a form in which a first object related to the first product dropped into the electronic cart is arranged and a second object related to the acquired second product is further arranged, if the acquired second bonus is more advantageous than the acquired first bonus;

an acceptor that accepts an order of the first product when the first object is operated; and a cart manager that drops the second product into the electronic cart when the second object is operated.

A non-transitory computer readable recording medium according to the fourth aspect of the present disclosure on which a program is stored, the program causing a computer to function as:

an acquirer that acquires, when a first product is dropped into an electronic cart, a second product similar to the first product, a first bonus provided on condition that the first product is ordered, and a second bonus provided on condition that the second product is ordered;

a presenter that presents a form in which a first object related to the first product dropped into the electronic cart is arranged and a second object related to the acquired second product is further arranged if the acquired second bonus is more advantageous than the acquired first bonus;

an acceptor that accepts an order for the first product when the first object is operated; and a cart manager that drops the second product into the electronic cart when the second object is operated.

Advantageous Effects of Invention

The present disclosure can present a product for which a bonus more valuable to a user is provided.

DESCRIPTION OF EMBODIMENTS

Embodiments of the present disclosure are explained in detail with reference to the drawings.

Figure 1:
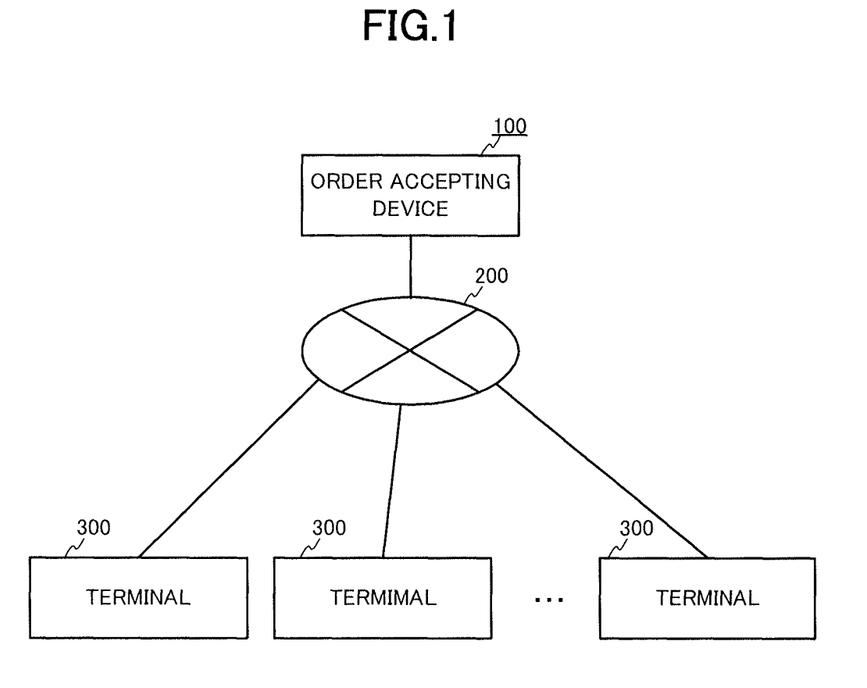
FIG. 1 is an explanatory drawing showing the relationship between the order accepting device and user operating terminals according to an embodiment.

The order accepting device 100 according to the embodiment of the present disclosure is connected to the Internet 200 as shown in FIG. 1. Moreover, a plurality of terminals 300 operated by a user are connected to the Internet 200. The user purchases and/or sells products using the terminals 300. The order accepting device 100 accepts the information and/or the like on the product the user desires to purchase and performs an ordering procedure for the product from the plurality of user terminals 300 via the Internet 200.

Then, the hardware configuration of the order accepting device 100 is explained.

Figure 2:
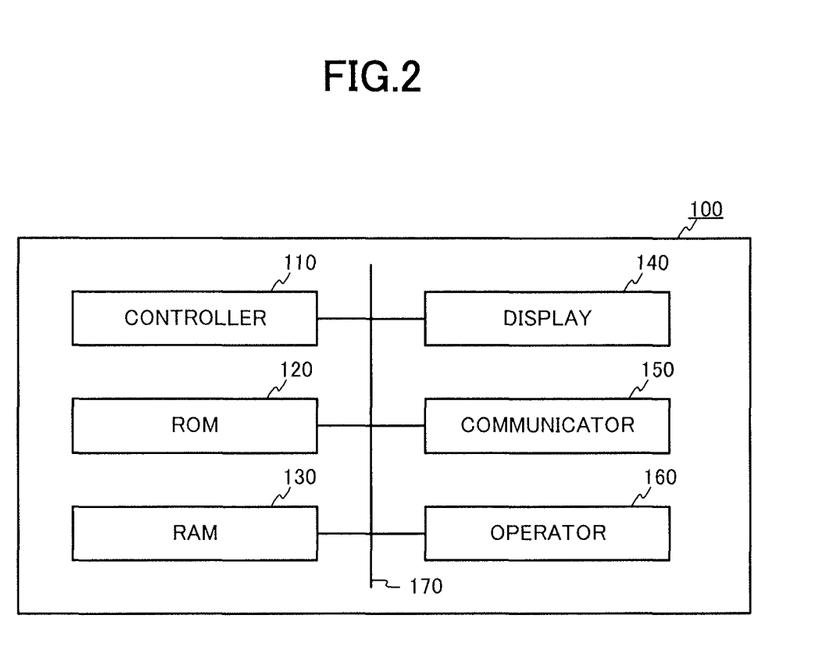
FIG. 2 is a schematic block diagram showing a hardware configuration of the order accepting device.

FIG. 2 is a schematic block diagram showing the hardware configuration of the order accepting device 100. As shown in FIG. 2, the order accepting device 100 comprises a controller 110, a Read Only Memory (ROM) 120, a Random Access Memory (RAM) 130, a display 140, a communicator 150, and an operator 160, and each component is connected by a bus 170.

The controller 110 comprises, for example, a Central Procedure Unit (CPU), and controls the entire order accepting device 100.

The ROM 120 is a nonvolatile memory that stores a program for the controller 110 to control the entire order accepting device 100 and various data.

The RAM 130 is a volatile memory for temporarily storing the information generated by the controller 110 and/or data required for generating the information.

The display 140 comprises a display device comprising a Liquid Crystal Display (LCD), a back light and the like. The display 140 displays, for example, the data outputted from the controller 110 under the control of the controller 110.

The communicator 150 comprises a communication interface for connecting the order accepting device 100 to the network 200.

The operator 160 comprises input devices, such as a button, a touch panel, a keyboard and the like. The operator 230 accepts an operation input from a user, and outputs to the controller 110 an operation input signal corresponding to the accepted operation input.

Then, the functional configuration of the order accepting device 100 is explained.

Figure 3:
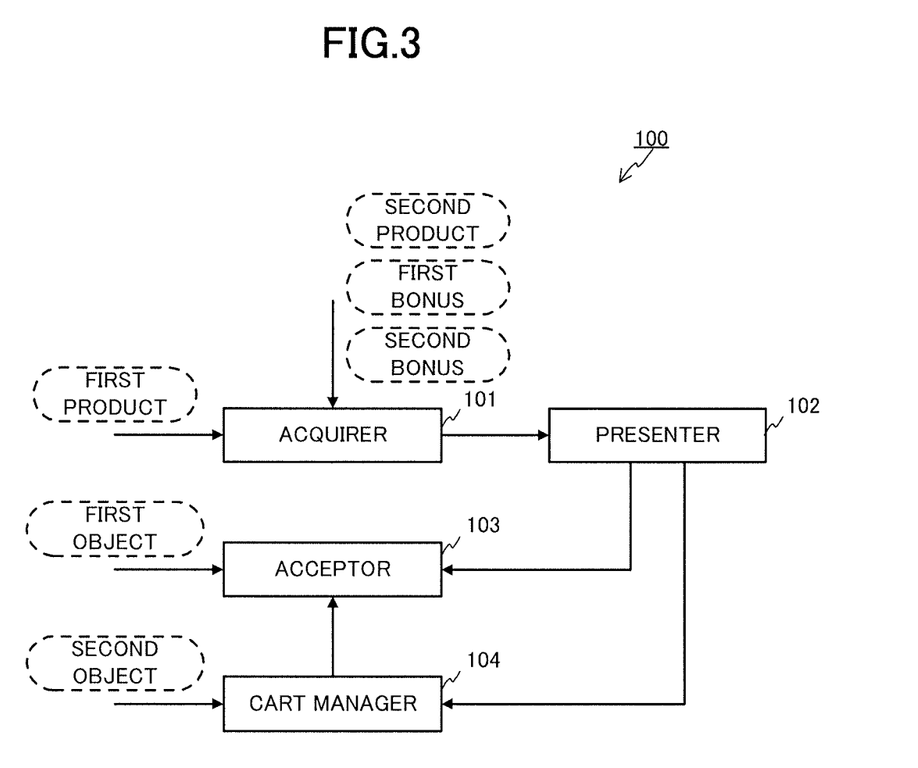
FIG. 3 is a schematic block diagram showing the functional configuration of the order accepting device.
Figure 4:
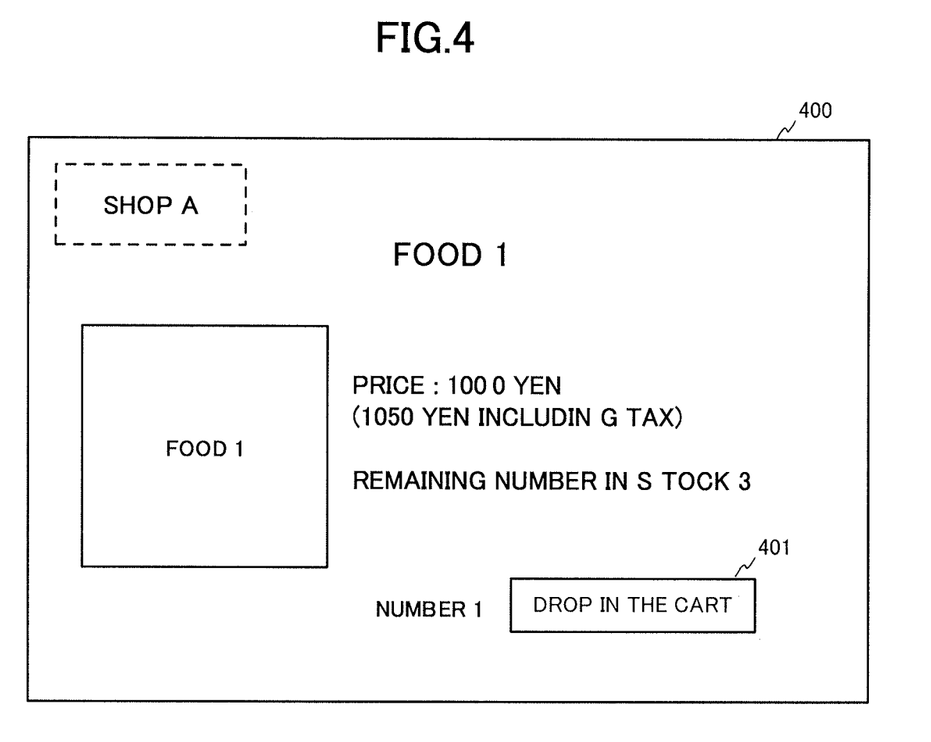
FIG. 4 is a schematic block diagram showing an example of a page showing detailed information of a product.

FIG. 4 is a schematic block diagram showing the functional configuration of the order accepting device 100. As shown in FIG. 4, the order accepting device 100 comprises an acquirer 101, a presenter 102, an acceptor 103 and a cart manager 104.

The acquirer 101 acquires, when a first product is dropped into an electronic cart, a second product similar to the first product, a first bonus provided on condition that an order for the first product is placed, and the second product provided on condition that an order for the second product is placed.

Here, the electronic cart is a cart electronically expressed on the WEB into which the user fetches and drops a product which the user is going to purchase from a shelf on which the product is displayed at a shop such as a supermarket. Specifically, the electronic cart comprises a list of user selected products.

Specifically, the acquirer 101 acquires, at a shopping site, a product which the user drops into the electronic cart as the first product. For example, assume that a user X views the product an Internet shop "SHOP A" is handling at the terminal 300. If the user X selects "FOOD 1" among a plurality of products, the screen of the terminal 300 displays the page 400 showing the detailed information on the "FOOD 1" as shown in FIG. 4 as an example. When the user X clicked on the button 401 for purchasing the "FOOD 1", the "FOOD 1" is in the state of being dropped into the electronic cart. "The state of being dropped into the electronic cart" is a state in which the user desires to purchase the product in the electronic cart but the order is not complete yet and can stop purchasing the product. Therefore, in the example mentioned above, when the user X clicks on the button 401, the acquirer 101 acquires the "FOOD 1" as the first product.

Then, the acquirer 101 acquires a second product similar to the first product. As an example of the acquiring method of the second product, the acquirer 101 references a product table 121 recorded on the ROM 120 representing a list of the products currently being sold at the shopping site, and acquires as the second product at least one of a product sold in a shop which is identical to a shop in which the first product is sold, and a product manufactured by a manufacturer which is identical to a manufacturer in which the first product is manufactured. Demerits of the shop and the manufacturer of presenting competitors' similar products can be overcome by acquiring such a product as the second product similar to the first product.

Figure 5:
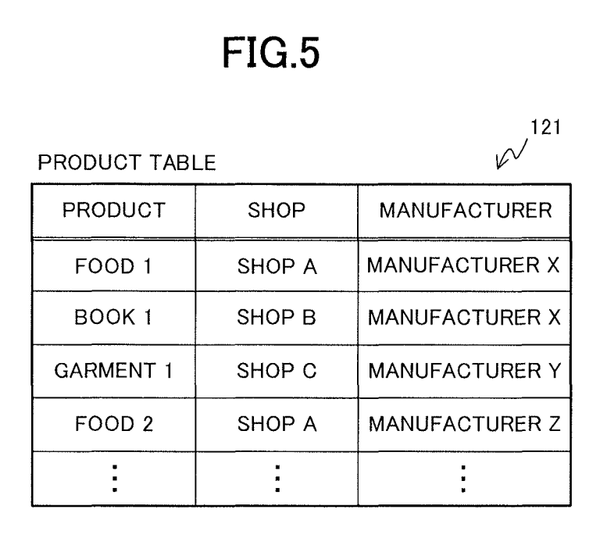
FIG. 5 is a table showing an example of data stored in a product table.

An example of data being stored in the product table 121 is shown in FIG. 5. In the product table 121 shown in FIG. 5, a "PRODUCT" is defined as a product being sold at a shopping site. A "SHOP" is defined as a shop selling the product. A "MANUFACTURER" is defined as a manufacturer who manufactures the product.

Therefore, for example, when the "FOOD 1" is dropped into an electronic cart as the first product, the acquirer 101 references the product table 121 shown in FIG. 5 and acquires the "FOOD 2" which is a product sold at a shop identical to "SHOP A" which sells the "FOOD 1" as the second product.

Moreover, the acquirer 101 acquires a first bonus provided on condition that an order for the first product is placed. As an example of the acquiring method of the first bonus, the acquirer 101 references a bonus table 122 showing a list of bonuses recorded on the ROM 120 and acquires a bonus which is provided on condition that the order of the first product is placed as the first bonus.

Figure 6:
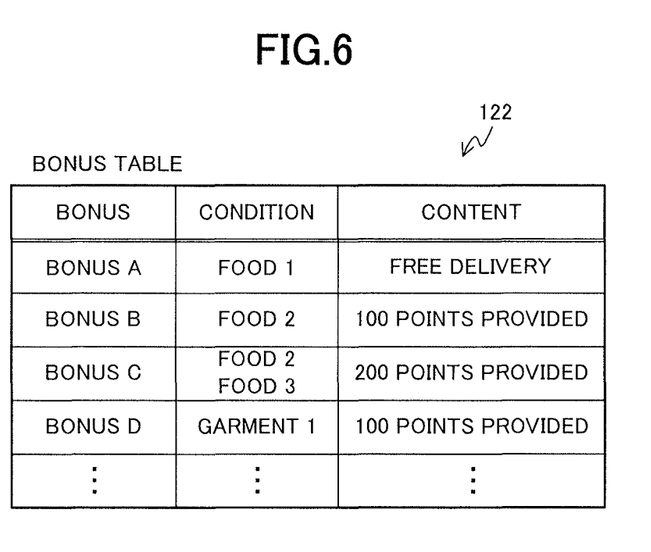
FIG. 6 is a table showing an example of data stored in a bonus table.

An example of data stored in the bonus table 122 is shown in FIG. 6. In the bonus table 122 shown in FIG. 6, a "BONUS" is defined as a bonus provided on condition that an order for the product currently sold at the shopping site is placed. A "CONDITION" indicates a product required to be ordered in order to provide a bonus. For example, a "BONUS A" is provided to the user who ordered the "FOOD 1" on condition that the user ordered the "FOOD 1". A "BONUS C" is provided to the user who ordered a "FOOD 2" and a "FOOD 3" on condition that the user ordered both the "FOOD 2" and the "FOOD 3". The term "content" indicates the content of the bonus provided. The term "CONTENT" is, for example, "FREE DELIVERY" which means that the delivery charge for delivering the ordered product to a user is free, "POINTS PROVIDED" which means that a point that can be used as 1 yen cash per point is given to the user for Internet shopping, or the like.

Therefore, for example, when the "FOOD 1" is dropped into an electronic cart as the first product, the acquirer 101 references the bonus table 122 shown in FIG. 6 and acquires the "BONUS A" which is related to the "FOOD 1" in the "CONDITION" as the first bonus.

Moreover, the acquirer 101 acquires the second bonus provided on condition that an order for the second product is placed. As an example of the acquiring method for the second bonus, the acquirer 101 acquires the second bonus in a method similar to the acquiring method for the above mentioned first bonus.

Therefore, for example, when the "FOOD 2" is acquired as the second product, the acquirer 101 references the bonus table 122 shown in FIG. 6 and acquires the "BONUS B" and the "BONUS C" which are related to the "FOOD 2" in the "CONDITION" as the second bonus.

In this embodiment, the controller 110 and the communicator 150 collaborate to function as the acquirer 101.

The presenter 102 provides a form in which the first object related to the first product dropped into the electronic cart is arranged and, if the acquired second bonus is more advantageous than the acquired first bonus, a second object related to the acquired second product is further arranged.

Specifically, the presenter 102 determines whether or not the second bonus acquired by the acquirer 101 is more advantageous than the first bonus. As an example of the determining method determining whether the second bonus is more advantageous than the first bonus, the presenter 102 computes a degree of advantage representing a degree of advantage to the user by setting a predetermined element as a parameter for the first bonus and the second bonus. If the degree of advantage of the second bonus is higher than the degree of advantage of the first bonus, the presenter 102 determines that the second bonus is more advantageous than the first bonus.

The predetermined elements in computing the degree of advantage of each bonus include, for example, at least one of the compensation to the user included in the bonus and the amount to be paid by the user as a condition of providing the bonus. The compensation to the user included in a bonus indicates the content of the bonus. For example, the content of each bonus is quantified according to the degree of advantage for the user. Specifically, when the content of a bonus is "FREE DELIVERY", "500" is given and in the case of "POINTS PROVIDED", the number of points provided is given as a numerical value used for calculating the degree of advantage, respectively. Moreover, the amount to be paid by the user as a condition of providing the bonus is, for example, the total amount of the delivery charge and a price of the product which the user needs to order, as the condition of providing the bonus. The presenter 102 computes, for example, the degree of advantage of the bonus by subtracting the amount to be paid by the user as a condition of providing the bonus from the numerical value given to the content of the bonus. In addition, the calculation method of the degree of advantage is not limited to the above. Elements other than the above-mentioned predetermined elements may be taken into consideration, or each element may be weighted.

Moreover, if the presenter 102 determines that the second bonus is more advantageous than the first bonus, the presenter 102 provides a form in which a first object related to the first product and a second object related to the second product are arranged.

Figure 7:
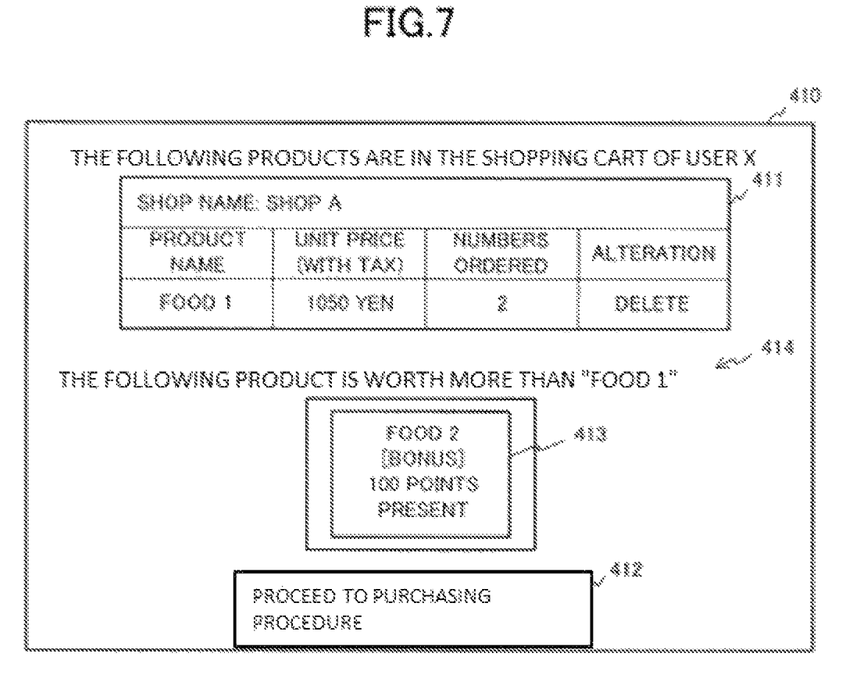
FIG. 7 is a schematic block diagram showing an example of a page showing an ordering procedure for a product.

FIG. 7 is a schematic diagram showing an example of the form (page 410) presented by the presenter 102 in the screen of the terminals 300, when the second bonus is determined to be more advantageous than the first bonus. For example, when the user X clicked on the button 401 shown in FIG. 4, the presenter 102, as shown in FIG. 7, presents on the screen of the terminals 300 a page 410 in which are arranged a list 411 of the first product dropped into the electronic cart, a button 412 which is the first object related to the first product, and a button 413 which is the second object related to the second product. The button 412 is a button which accepts an order of the first product. The button 413 is a button for dropping the second product into an electronic cart. Moreover, above the button 413, a message 414 for a user that the second product is more advantageous than the first product is arranged.

Specifically, if the result of the presenter 102 computing the degrees of advantage of the first bonus "BONUS A" and the second bonuses "BONUS B" and "BONUS C" acquired by the acquirer 101 shows that the degree of advantage of the "BONUS B" is higher than the degree of advantage of the "BONUS A" and the degree of advantage of the "BONUS C" is lower than the degree of advantage of the "BONUS A", respectively, the page 410 shown in FIG. 7 represents a form presented by the presenter 102. Therefore, the button 413 related to the "BONUS B" is arranged on the page 410, and the button related to the "BONUS C" is not arranged on the page 410.

In this embodiment, the controller 110 and the communicator 150 collaborate to function as the presenter 102.

The acceptor 103 accepts an order of the first product, when the first object is operated.

Figure 8:
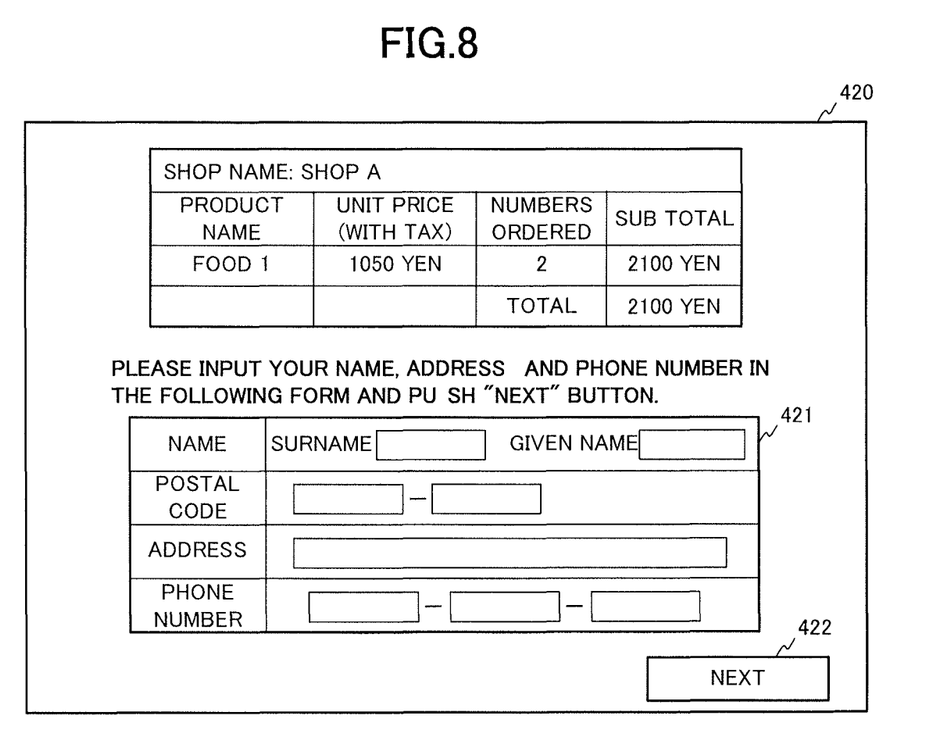
FIG. 8 is a schematic block diagram showing an example of a page showing an ordering procedure for a product.

Specifically, the acceptor 103 presents a page 420 shown in FIG. 8, after the button 412 shown in FIG. 7 is operated. The page 420 includes a form 421 which accepts information required for the purchase procedure from a user, and the button 422 for transitioning to the next screen. The form 421 accepts the input of the user's name, address, and a telephone number, for example.

Moreover, the acceptor 103 presents on the screen of the terminals 300 a page (not shown) which accepts input of information required for establishing an order, such as a payment method, delivering method and the like by clicking on the button 422 by the user, and a page (also not shown) for making the user check the information inputted by the user. The acceptor 103 establishes the order by accepting input from the user that establishes the order, for example, by clicking on the button displayed on the screen by the user.

In this embodiment, the controller 110 and the communicator 150 collaborate to function as the acceptor 102.

The cart manager 104 drops the second product into the electronic cart, when the second object is operated. Moreover, the cart manager 104 deletes the first product from the electronic cart.

Figure 9:
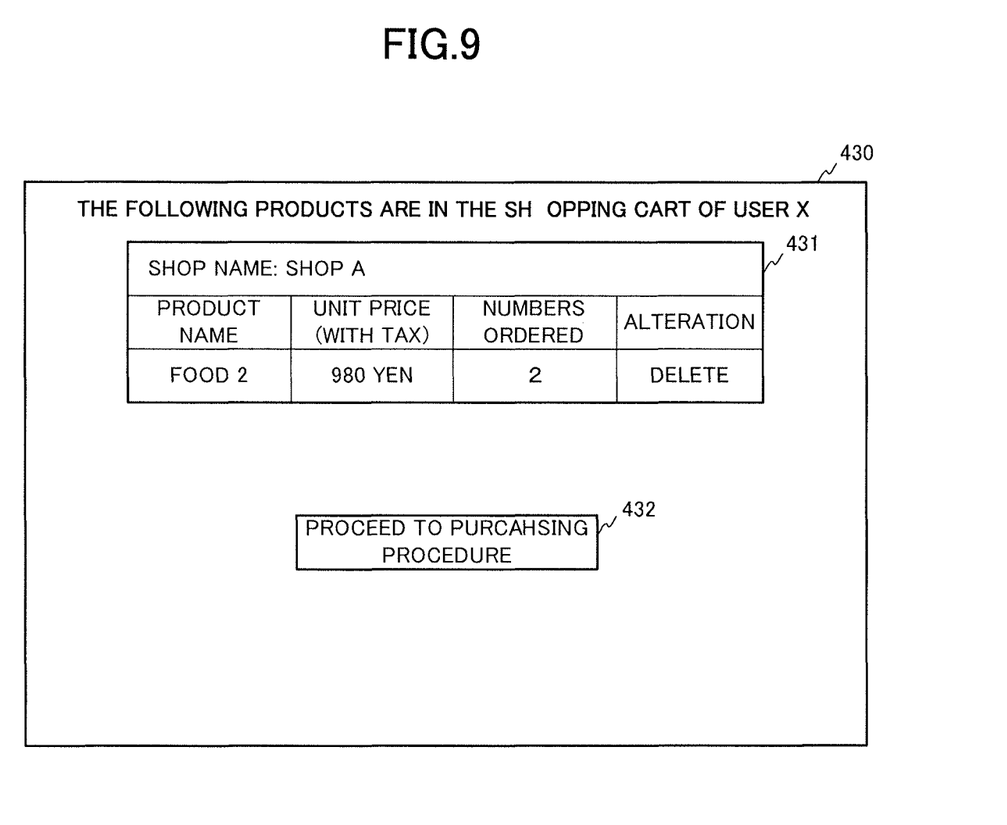
FIG. 9 is a schematic block diagram showing an example of a page showing an ordering procedure for a product.

Specifically, when the button 413 shown in FIG. 7 is operated, the cart manager 104 presents a page 430 in which a list 431 of the product dropped into the electronic cart and a button 432 are arranged on the screen of the terminals 300 as shown in FIG. 9. The cart manager 104 presents the list 431 shown in FIG. 9 by deleting the "FOOD 1" which is the first product in the list 411 shown in FIG. 7 and adding the "FOOD 2" which is the second product related to the button 413. A button 432 is a button which accepts an order of the product included in the list 431. The acceptor 103 accepts the order of the product in the electronic cart by the user clicking the button 432.

In this embodiment, the controller 110 and the communicator 150 collaborate to function as the cart manager 104.

Then, the operation of the order accepting device 100 according to this embodiment is explained.

Figure 10:
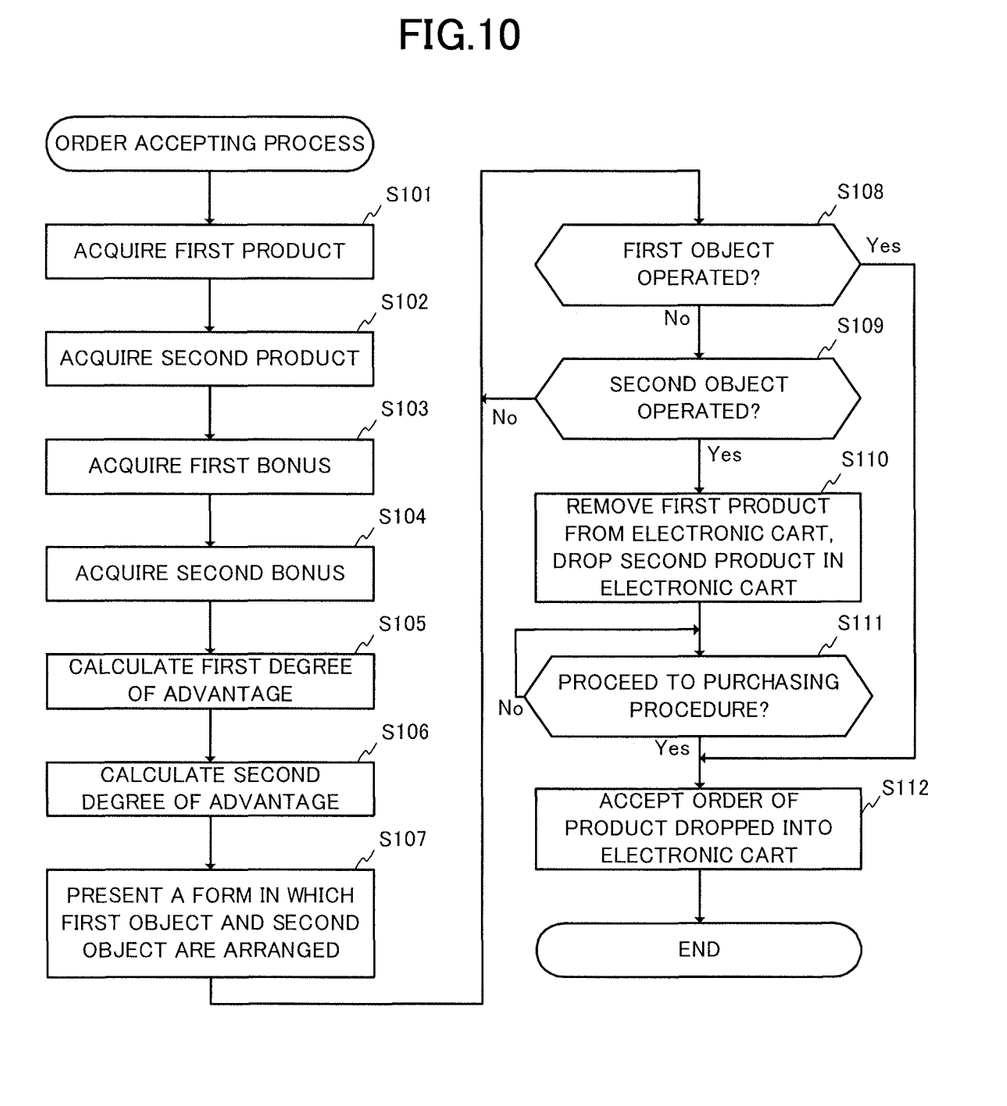
FIG. 10 is an example of a flow chart of the order accepting procedure.

The order accepting process performed by the controller 110 of the order accepting device 100 is explained. FIG. 10 is an example of the flow chart of the order accepting process. The order accepting process shown in FIG. 10 starts, for example, when the page 400 shown in FIG. 4 is displayed on the screen of a user terminal 300, and the button 401 displaying "drop into the cart" arranged on the page 400 is chosen. Moreover, this process is performed, for example, when the CPU of the controller 110 reads the program stored in the ROM 120. The following explains an example in which the user X dropped the "FOOD 1" into the electronic cart.

The acquirer 101 acquires the first product dropped into the electronic cart from the terminals 300 (Step S101). Specifically, the acquirer 101 acquires the "FOOD 1" as the first product from the terminals 300.

Then, the acquirer 101 acquires a second product similar to the first product acquired in Step S101 (Step S102). Specifically, the acquirer 101 references the product table 121 shown in FIG. 5 and acquires the "FOOD 2" as the second product which is a product sold in the same shop as the "SHOP A" which sells the "FOOD 1".

The acquirer 101 acquires the first bonus provided on condition that an order for the first product acquired in Step S101 is placed (Step S103). Specifically, the acquirer 101 references the bonus table 122 shown in FIG. 6 and acquires the "BONUS A" as the first bonus which is related to the first product "FOOD 1" in the "CONDITION".

Moreover, the acquirer 101 acquires the second bonus provided on condition that an order for the second product acquired in Step S102 is placed (Step S104). Specifically, the acquirer 101 references the bonus table 122 shown in FIG. 6 and acquires the "BONUS B" and the "BONUS C" as the second bonus which are related to the second product "FOOD 2" in the "CONDITION".

Then, the presenter 102 computes the degree of advantage of the first bonus (first degree of advantage) acquired in Step S103 (Step S105). Specifically, the presenter 102 computes the first degree of advantage based on the "CONTENT" of the first bonus "BONUS A", that is, "FREE DELIVERY", and the price and delivery charge of the "FOOD 1" which are the amounts the user X should pay in order to receive the first bonus "BONUS A".

Moreover, the presenter 102 computes the degree of advantage of each second bonus acquired in Step S104 (second degree of advantage) (Step S106). Specifically, the presenter 102 computes the second degree of advantage of the "BONUS B" based on the "CONTENT" of the second bonus "BONUS B", "100 POINTS PROVIDED" and the price and delivery charge of the "FOOD 2" which are the amounts the user X should pay in order to receive the second bonus "BONUS B". Moreover, the presenter 102 computes the degree of advantage of "BONUS C" based on the "CONTENT" of the second bonus "BONUS C", "200 POINTS PROVIDED" and the prices and delivery charges of the "FOOD 2" and "FOOD 3" which are the amounts the user X should pay in order to receive the second bonus "BONUS C".

Then, the presenter 102 presents a form in which the first object related to the first product acquired in Step S101 and the second object related to the second product related to the second bonus which is acquired when the second degree of advantage computed in Step S106 is higher than the first degree of advantage computed in Step S106 are arranged (Step S107). Specifically, the presenter 102 determines that the second degree of advantage of "BONUS B" computed in Step S106 is higher than the first degree of advantage computed in Step S105 and the second degree of advantage of "BONUS C" computed in Step S106 is lower than the first degree of advantage computed in Step S105. As shown in FIG. 7, the presenter 102 presents the page 410, in which the button 412 related to the "FOOD 1" and the button 413 related to the "FOOD 2" related to the "BONUS B" are arranged, on the terminal 300.

Then, the presenter 102 determines whether or not the first object is operated by the user X (Step S108). Specifically, the presenter 103 determines whether or not the information showing that the user X clicked the button 412 in FIG. 7 is acquired from the terminals 300.

When the presenter 102 determines that the first object is not operated by the user X (Step S108; No), the presenter 102 determines whether or not the second object is operated by the user X (Step S109). Specifically, the presenter 102 determines whether or not the information showing that the user X clicked the button 413 shown in FIG. 7 is acquired from the terminals 300.

When the presenter 102 determines that the second object is not operated by the user X (Step S109; No), the presenter 102 returns to Step S108, and repeats the process.

When the presenter 102 determines that the second object is operated by the user X (Step S109; Yes), the cart manager 104 removes the first product dropped into the electronic cart and drops into the electronic cart the second product related to the second object operated in Step 109 (Step S110). Specifically, in the list 411 shown in FIG. 7, the cart manager 104 deletes the "FOOD 1" which is the first product, and, adds the "FOOD 2" which is the second product related to the button 413. The cart manager 104 presents the page 430 in which the list 431 and the button 432 are arranged on the screen of the terminals 300 as shown in FIG. 9.

Then, the acceptor 103 determines whether or not the user X inputs the operation to proceed to the purchase procedure for the product included in the electronic cart (Step S111). Specifically, the presenter 102 determines whether or not the information showing that the user X clicked the button 432 in FIG. 9 is acquired from the terminals 300. When the presenter 102 determines that the operation to proceed to the purchase procedure for the product included in the electronic cart has not been inputted by the user X (Step S111; No), the acceptor 103 stands by as is.

When the presenter 102 determines that the operation to proceed to the purchase procedure for the product included in the electronic cart is inputted by the user X (Step S111; Yes), the acceptor 103 accepts the order of the product included in the electronic cart (Step S112). Specifically, in Step S108, if the presenter 102 acquires the information showing that the user X clicked the button 412 in FIG. 7 from the terminals 300, the acceptor 103 acquires information required for establishing an order from the user X by presenting the page 420 as shown in FIG. 8 on the screen of the terminals 300 and establishes the order of the "FOOD 1" included in the electronic cart. In Step S111, if the acceptor 103 acquires the information showing that the user X clicked the button 432 shown in FIG. 9 from the terminals 300, the acceptor 103 acquires information required for establishing the order from the user X by presenting a page similar to the page 420 as shown in FIG. 8 on the screen of the terminals 300 and establishes the order of the "FOOD 2" included in the electronic cart. Then, this process ends.

As explained above, in the order accepting device 100 of this embodiment, if the first product is dropped into the electronic cart, a second product which is similar to the first product and is related to a second bonus more advantageous than the first bonus related to the first product is presented to the user. Therefore, before the user actually purchases the product in the electronic cart, he/she can compare the first product in the electronic cart with the second product similar to the first product, and can choose and purchase a more advantageous product.

As mentioned above, although the embodiment of the present disclosure is explained, the present disclosure is not limited to this embodiment. Modifications of this embodiment are explained below. In addition, in the following modifications, the same reference numerals are used for configurations similar to the above-mentioned embodiments, and the detailed explanation is omitted.

(Modification 1)

In the above-mentioned embodiment, the presenter 102 may present a form, in which a second object related to the second product whose degree of similarity representing the degree of similarity with the first product is higher than a predetermined standard of comparison, among second products related to the second bonus which is more advantageous than the first bonus, is arranged. In this case, the degree of similarity is, for example, the degree of whether or not the amount of the first product is close to the amount of the second product. Specifically, assume that six-pack of product G1 (500 ml bottled drinks) are included in the electronic cart as the first product. If the total amount of a product G2 (pack of four bottle drinks of 350 ml) and the total amount of a product G3 (pack of 12 bottle drinks of 350 ml) are compared, the total amount of the product G3 is closer to the total amount of the product G1 than the total amount of the product G2. Thus, the degree of similarity of the product G3 is determined to be higher than the degree of similarity of the product G2.

The user can choose the second product that is more similar to the first product dropped into the electronic cart by presenting a form in which the second object, related to the second product whose degree of similarity acquired as mentioned above is higher than a predetermined comparative criterion, is arranged.

(Modification 2)

In Step S110 of the order accepting process shown in FIG. 10 of the above-mentioned embodiment, the cart manager 104 removes the first product dropped into the electronic cart, and drops the second product related to the second object operated in Step 109 into the electronic cart in the same quantity of the removed first product. Specifically, the cart manager 104 deletes "FOOD 1" whose NUMBERS ORDERED is "2" from the list 411 shown in FIG. 7, and adds "FOOD 2" whose NUMBERS ORDERED is the same number as the NUMBERS ORDERED of the removed "FOOD 1" into the list 431 shown in FIG. 9. However, the number of the second food that the cart manager 104 adds is not limited to the number identical to the number of the deleted first product. The cart manager 104 may drop the second product in the amount closest to the amount of the first product into the electronic cart among the amount equivalent to the amount of the first product and an amount more than the amount of the first product.

For example, as the first product, when one product G4 (bottle drink of 500 ml) is dropped into the electronic cart, the acquirer 101 is assumed to acquire a product G5 (bottle drink of 350 ml) as the second product. When the presenter 102 determines that the second object related to the product G5 is operated by the user X (Step S109; Yes), the cart manager 104 removes one product G4 dropped in the electronic cart and drops two products G5 in the electronic cart (Step S110). Because, although the amount of 350 ml of one product G5 is closer to the total amount 500 ml of the product G4 dropped into the electronic cart than the total amount 700 ml of the two products G5, the amount of 350 ml of one product G5 is less than the total amount 500 ml of the product G4. Therefore, two items of product G5, whose total amount is more than the total amount of the product G4 dropped in the electronic cart and is closest to the total amount of the product G4, are dropped into the electronic cart.

In this way, the user himself or herself can save his or her time and effort to adjust the amount of the second product in a manner that the amount of the second product to the electronic cart is adjusted according to the amount of the deleted first product.

In addition, in the above embodiment, programs executed by the order accepting device 100 may be stored and distributed on a computer readable recording medium such as a flexible disk, a Compact Disk Read-Only Memory (CD-ROM), a Digital Versatile Disk (DVD), a Magneto-Optical Disk (MO) and the like. The order accepting device 100 that executes above-mentioned processes may be configured by installing the program in an information processing device such as a personal computer or the like.

Moreover, the program may be stored in a disk device or the like of a predetermined server device on a communication network such as the Internet or the like. The program, for example, may be downloaded by being superimposed on a carrier.

Moreover, when the above-mentioned function is realized by various functions of an Operating System (OS), or when the above-mentioned function is realized by the collaboration of an OS and an application, only programs other than the portion which realizes the function of the OS may be stored in a recording medium and distributed, or may be downloaded.

The present disclosure can be implemented in various embodiments and modifications without departing from the broadest spirit and scope of the present disclosure. Moreover, the embodiment mentioned above is for explaining the present disclosure, and does not limit the scope of the present disclosure. That is, the scope of the present disclosure is indicated by the scope of the claims, not by the embodiments. The scope of the claims and various modifications implemented within the meaning of the disclosure equivalent to the scope of the claims are regarded as being within the limits of the present disclosure.

INDUSTRIAL APPLICABILITY

The present disclosure is suitable for the electronic commerce using networks, such as the Internet.

REFERENCE SIGNS LIST

100 Order accepting device
101 Acquirer
102 Presenter
103 Acceptor
104 Cart manager
110 Controller
120 ROM
121 Product table
122 Bonus table
130 RAM
140 Display
150 Communicator
160 Operator
170 Bus
200 Network
300 Terminals
400 to 430 Pages
401, 412, 413, 422, and 432 Buttons
411 and 431 Lists
421 Form

The invention claimed is:

1. An order accepting device comprising:
at least one memory configured to store computer program code; and
at least one processor configured to access said at least one memory, read said computer program code, and operate as instructed by said computer program code, said computer program code including:
acquirer code configured to cause at least one of said at least one processor to acquire and compare at a first time, in response to a first product being added to an electronic cart by a user:
a first bonus to be provided on condition that an order for the first product is placed, wherein the first bonus corresponds to a first e-commerce compensation, and
a second bonus to be provided on condition that an order for a second product is placed, wherein the second product is similar to and substitutable for the first product and the second bonus corresponds to a second e-commerce compensation;
presenter code configured to cause at least one of said at least one processor to present, when it is determined as a result of comparison at the first time that the second bonus is more advantageous than the first bonus, to the user at a second time after the first time a form in which a first object related to the first product and a second object related to the second product are arranged with the first object near the second object, wherein the form includes: i) information about the first product, and ii) a message indicating that the second bonus is worth more than the first bonus, and wherein the message and the second object are arranged between the information and the first object;
acceptor code configured to cause at least one of said at least one processor to accept an order for the first product at a third time after the second time when the first object is selected by the user; and
cart manager code configured to cause at least one of said at least one processor to add the second product to the electronic cart and to delete the first product from the electronic cart when the second object is selected by the user, thereby saving time and effort of the user to replace, in the electronic cart, the first product with the second product.

2. The order accepting device according to claim 1, wherein
the acquirer code is further configured to cause at least one of said at least one processor to acquire the second product from a product sold in a shop which is identical to a shop in which the first product is sold.

3. The order accepting device according to claim 1, wherein
the presenter code is further configured to cause at least one of said at least one processor to present a second form in which the second object is further arranged, the second object being related to the second product, and a degree of similarity, showing how similar the second product is to the first product, being higher than a predetermined standard for comparison.

4. The order accepting device according to claim 1, wherein
the presenter code is further configured to cause at least one of said at least one processor to automatically determine that, the greater a compensation to the user that is included in the second bonus compared with a compensation to the user that is included in the first bonus, the more advantageous is the second bonus than the first bonus; and the smaller the compensation to be paid by the user on condition that the second bonus is provided compared with the compensation to be paid by the user on condition that the first bonus is provided, the more advantageous is the second bonus than the first bonus.

5. The order accepting device according to claim 4, wherein
the cart manager code is further configured to cause at least one of said at least one processor to automatically drop into the electronic cart the second product in an automatically-determined amount, wherein the automatically-determined amount is closest to the amount of the first product and is more than the amount of the first product.

6. The order accepting device according to claim 5, wherein the presenter code is further configured to cause at least one of said at least one processor to present a second form in which the second product is further arranged with the automatically-determined amount of the second product, and wherein the second form represents a contents of the electronic cart.

7. The order accepting device according to claim 1, wherein the acquirer code configured to cause at least one of said at least one processor to acquire the first bonus and the second bonus at the first time from a bonus table which pre-associates bonuses with products respectively.

8. The order accepting device according to claim 1, wherein the presenter code is additionally configured to cause at least one of said at least one processor to present, when it is determined as the result of the comparison at the first time that the second bonus is more disadvantageous than the first bonus, another form in which the first object is arranged without the second object and without the message.

9. An order accepting method performed by an order accepting device, the order accepting method comprising:
acquiring and comparing, at a first time in response to a first product being added to an electronic cart by a user:
a first bonus to be provided on condition that an-order for the first product is placed, wherein the first bonus corresponds to a first e-commerce compensation, and
a second bonus to be provided on condition that an order for a second product is placed, wherein the second product is similar to and substitutable for the first product and the second bonus corresponds to a second e-commerce compensation;
determining whether the second bonus is more advantageous than the first bonus;
presenting to the user at a second time after the first time, when the second bonus is more advantageous than the first bonus, a form in which a first object related to the first product and a second object related to the second product are arranged with the first object near the second object, wherein the form includes: i) information about the first product, and ii) a message indicating that the second bonus is worth more than the first bonus, and wherein the message and the second object are arranged between the information and the first object;
accepting an order for the first product at a third time after the second time when the first object is selected by the user; and
adding the second product to the electronic cart and deleting the first product from the electronic cart when the second object is selected by the user, thereby saving time and effort of the user to replace, in the electronic cart, the first product with the second product.

10. An order accepting device comprising:
at least one memory configured to store computer program code; and
at least one processor configured to access said at least one memory, read said computer program code, and operate as instructed by said computer program code, said computer program code including:
acquirer code configured to cause at least one of said at least one processor to acquire from the database at a first time and in response to a first product being added to an electronic cart by a user:
A) a first bonus to be provided on condition that an order for the first product is placed, wherein the first bonus corresponds to a first e-commerce compensation, and
B) a second bonus to be provided on condition that an order for a second product is placed, wherein the second product is similar to and substitutable for the first product and the second bonus corresponds to a second e-commerce compensation;
comparison code configured to cause at least one of said at least one processor to:
calculate a first degree of advantage of the first bonus and a second degree of advantage of the second bonus, and
determine that the second bonus is more advantageous than the first bonus;
presenter code configured to cause at least one of said at least one processor to present to the user, at a second time after the first time and in response to the calculating, a form in which a first object related to the first product and a second object related to the second product are arranged with the first object near the second object, wherein the form includes: i) information about the first product, and ii) a message indicating that the second bonus is worth more than the first bonus, and wherein the message and the second object are arranged between the information and the first object;
cart manager code configured to cause at least one of said at least one processor to:
accept an order for the first product when the first object is selected by the user, and
add the second product to the electronic cart and deleting the first product from the electronic cart when the second object is selected by the user, the order accepting device thereby saving time and effort of the user to replace, in the electronic cart, the first product with the second product.

11. The order accepting device according to claim 10, wherein
the acquirer code is further configured to cause at least one of said at least one processor to acquire the second product from a product sold in a shop which is identical to a shop in which the first product is sold.

12. The order accepting device according to claim 10, wherein
the presenter code is further configured to cause at least one of said at least one processor to present a second form in which the second object is further arranged, the second object being related to the second product, and a degree of similarity, showing how similar the second product is to the first product, being higher than a predetermined standard for comparison.

13. The order accepting device according to claim 10, wherein
the presenter code is further configured to cause at least one of said at least one processor to automatically determine that, the greater a compensation to the user that is included in the second bonus compared with a compensation to the user that is included in the first bonus, the more advantageous is the second bonus than the first bonus; and the smaller the compensation to be paid by the user on condition that the second bonus is provided compared with the compensation to be paid by the user on condition that the first bonus is provided, the more advantageous is the second bonus than the first bonus.

14. The order accepting device according to claim 13, wherein
the cart manager code is further configured to cause at least one of said at least one processor to automatically drop into the electronic cart the second product in an automatically-determined amount, wherein the automatically-determined amount is closest to the amount of the first product and is more than the amount of the first product.

15. The order accepting device according to claim 14, wherein the presenter code is further configured to cause at least one of said at least one processor to present a second form in which the second product is further arranged with the automatically-determined amount of the second product, and wherein the second form represents a contents of the electronic cart.

16. The order accepting device according to claim 10, wherein the acquirer code configured to cause at least one of said at least one processor to acquire the first bonus and the second bonus at the first time from a bonus table in the database, wherein the table pre-associates bonuses with products respectively.

17. An order accepting process for saving time, the order accepting process performed by an order accepting device with access to a database, the order accepting process comprising:
acquiring from the database at a first time of the order accepting process and in response to a first product being added to an electronic cart by a user:
A) a first bonus to be provided on condition that an order for the first product is placed, wherein the first bonus corresponds to a first e-commerce compensation, and
B) a second bonus to be provided on condition that an order for a second product is placed, wherein the second product is similar to and substitutable for the first product and the second bonus corresponds to a second e-commerce compensation;
calculating a first degree of advantage of the first bonus and a second degree of advantage of the second bonus;
determining, based on the calculating, that the second bonus is more advantageous than the first bonus;
presenting to the user, at a second time of the order accepting process after the first time and in response to the calculating, a form in which a first object related to the first product and a second object related to the second product are arranged with the first object near the second object, wherein the form includes; i) information about the first product, and ii) a message indicating that the second bonus is worth more than the first bonus, and wherein the message and the second object are arranged between the information and the first object;
accepting an order for the first product when the first object is selected by the user; and
adding the second product to the electronic cart and deleting the first product from the electronic cart when the second object is selected by the user, the order accepting process thereby saving time and effort of the user to replace, in the electronic cart, the first product with the second product.

* * * * *